March 22, 1966 G. R. CILIAX 3,242,362
DYNAMOELECTRIC MACHINE BRUSH HOLDER ASSEMBLY
Filed May 16, 1963 2 Sheets-Sheet 2

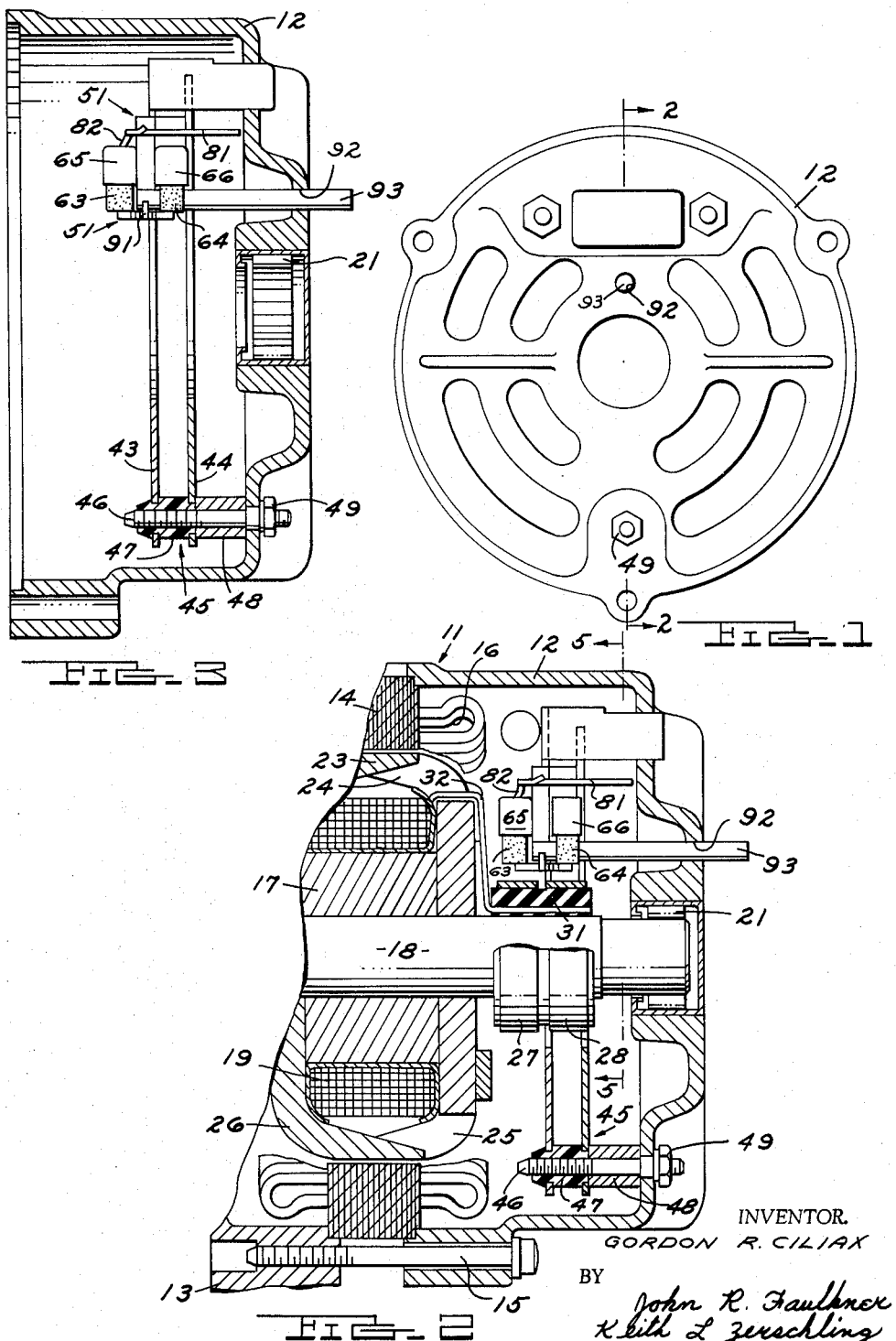

INVENTOR.
GORDON R. CILIAX
BY John R. Faulkner
Keith L. Zerschling
ATTORNEYS

United States Patent Office 3,242,362
Patented Mar. 22, 1966

3,242,362
DYNAMOELECTRIC MACHINE BRUSH HOLDER
ASSEMBLY
Gordon R. Ciliax, Livonia, Mich., assignor to Ford Motor
Company, Dearborn, Mich., a corporation of Delaware
Filed May 16, 1963, Ser. No. 281,388
10 Claims. (Cl. 310—239)

This application is a continuation-in-part of my copending application Serial No. 162,356, filed Dec. 27, 1961, now abandoned.

This invention relates to a dynamoelectric machine and more particularly to a dynamoelectric machine including a structure that facilitates assembly of the machine by holding an electrical contact brush in spaced relationship to a current conductive means carried by the rotor of the machine during assembly operations.

In the preferred embodiment of the invention, the dynamoelectric machine takes the form of an alternator. The alternator contains a rotor mounted within a stator and this rotor includes a slip ring connected to a field winding. A brush holder carrying an electrical contact brush is supported by the stator, and spring means are employed for urging the brush toward the slip ring. An aperture is positioned within the stator in alignment with a means carried by the stator and positioned adjacent the brush. This aperture and means are adapted to receive a holding means, preferably a rod that holds the brush in spaced relationship with respect to the slip ring during assembly operations. After assembly of the alternator has been completed, the holding means or rod is removed and the brush moves into contact with the slip ring.

In another embodiment of the invention the aperture has sufficient length that the material surrounding the aperture furnishes sufficient support for the holding means that the means carried by the stator positioned adjacent the brushes and in alignment with the aperture can be eliminated.

An object of the invention is the provision of a dynamoelectric machine that can readily be assembled.

Another object of the invention is the provision of an alternator that can be readily assembled.

Another object of the invention is the provision of a structure in an alternator that facilitates its assembly.

A further object of the invention is the provision of a structure in an alternator that will readily permit an electrical contact brush to be held in spaced relationship with respect to a slip ring during assembly operations.

Other objects and attendant advantages of the invention will become more apparent as the specification is considered in connection with the attached drawings in which:

FIGURE 1 is an end view of the alternator of the present invention;

FIGURE 2 is a partial sectional view of the alternator taken on the lines 2—2 of FIGURE 1 showing the alternator just prior to the completion of the assembly operations;

FIGURE 3 is a sectional view of a sub-assembly of the stator taken along the same lines as FIGURE 2;

Figure 5:
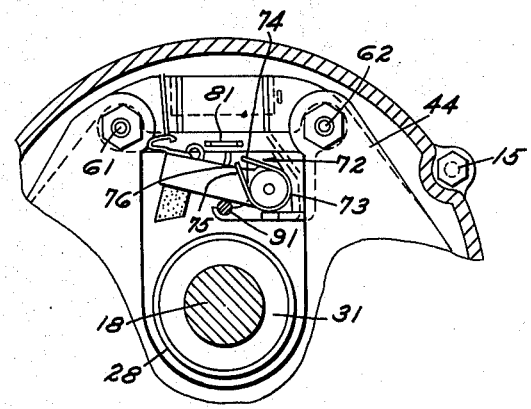
FIGURE 5 is a partial sectional view taken along the lines 5—5 of FIGURE 2.

Referring now to the drawings in which like reference numerals designate like parts throughout the several views thereof, the alternator includes a stator structure generally designated by the numeral 11. This stator structure includes a first cup housing 12, a second cup housing 13, and a laminated stator core 14. These three elements are fastened together by means of a plurality of machine screws, one of which is shown at 15, that position the cup housings 12 and 13 in engagement with the laminated core 14. A stator or armature winding 16, preferably a three-phase winding, is positioned about the laminated core 14 and is supported thereby.

A rotor, generally designated by the numeral 17 and including a shaft 18 and a field winding 19, is rotatably supported within the stator structure 11 by means of anti-friction bearings, one of which is positioned within the first cup housing 12 and is designated by the numeral 21. It is to be undertsood that the other end of the shaft 18 is rotatably supported in the second cup housing 13 by a similar anti-friction bearing. The rotor also includes a plurailty of interlaced metallic fingers, several of which are designated by the numerals 23, 24, 25 and 26, that cover the field winding 19 and that rotate in closely spaced relationship to the laminated core 14 and the stator or armature winding 16.

A pair of axially spaced current conductive means or slip rings 27 and 28 form a part of the rotor structure and are mounted upon the shaft 18 through a sleeve 31 constructed of insulating material. One of the slip rings is connected to one end of the field winding 19 and the other of the slip rings is connected to the other end of the field winding 19 by means of electrical leads, one of which is shown at 32.

The stator structure includes two conductive plates 43 and 44 that are supported from the first cup housing 12 by means of a plurality of fastener assemblies, one of which is shown in FIGURES 2 and 3 and is designated by the numeral 45. The fastener assembly 45 includes a threaded member 46, an insulated nut and bushing member 47 positioned between the plates 43 and 44 and a metallic spacer 48. The threaded member 46 passes through the cup housing 12 and has a nut 49 threaded thereon for securely fastening the conductive plates 43 and 44 to the remainder of the stator structure 11. The conductive plates 43 and 44 are employed to mount a rectifier for the alternator that may be composed of a plurality of silicon diodes. These diodes have been omitted from the drawings in the interests of clarity. The structure is fully described, however, in copending application Serial No. 69,048, filed Nov. 14, 1960, now Patent No. 3,106,656, in the name of Frank R. Merriam, Jr., and assigned to the assignee of this invention.

Figure 4:
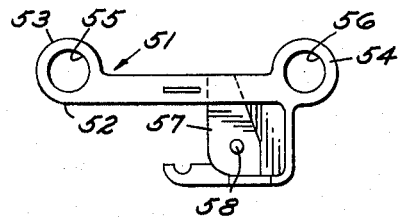
FIGURE 4 is a side elevational view of a portion of the stator that supports electrical contact brushes.
Figure 6:
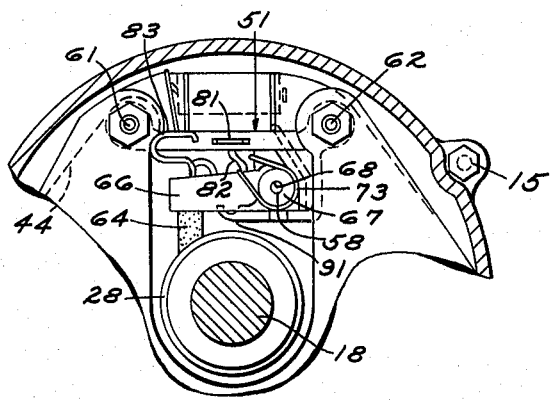
FIGURE 6 is a view similar to FIGURE 5 but showing the alternator after assembly operations have been completed.

To energize the field winding 19 the present invention employs an electrical contact brush assembly as can best be seen by reference to FIGURES 4, 5 and 6. This electrical contact brush assembly includes a support member 51 that is constructed of insulating material and that is supported between the two conductive plates 43 and 44. This support member is shown in detail in FIGURE 4 and it includes a central body portion 52 having enlarged terminating end portions 53 and 54 that are provided with apertures or bores 55 and 56 respectively. The support member includes a web 57 that depends from the central body portion 52 along one side thereof. Axially aligned pins extend from either side of the web 57, and one of these pins is shown at 58.

Referring now to FIGURES 5 and 6, it can be seen that the support member 51 is supported by and is positioned between electrical conductive plates 43 and 44 and hence forms part of the stator structure of the alternator. This is accomplished by means of bolt and nut assemblies 61 and 62 that extend through the electrical conductive plates 43 and 44 and through the apertures or bores 55 and 56 in the enlarged terminating end portions 53 and 54 of the support member 51.

A pair of electrical contact brushes 63 and 64 are carried by the stator structure, preferably by a pair of brush holders 65 and 66. Each of these brush holders includes an enlarged hub portion 67 that has a central bore 68 positioned therein. The hub portions of each of the brush holders 65 and 66 are positioned on the support member 51 so that the pin 58 and the other pin (not shown) that is in axial alignment with pin 58 extend through the bores 68 in the hub portions 67. Thus, the brush holders 65 and 66 are pivotally mounted upon the support member 51.

A means, preferably a spring means 72, is employed to urge the brushes 63 and 64 toward the slip rings 27 and 28. This spring means 72 includes a pair of spaced coils, one of which is shown at 73 in engagement with the hub portion 67 of the brush holder 66. It is to be understood that an identical coil is positioned in engagement with the hub portion 67 of brush holder 65. This spring has a central connecting portion 74 that engages the web 57 of support member 51 and has end portions, one of which is designated by the numeral 75, that engage cut-away portions or slots 76 positioned in each of the brush holders 65 and 66.

The electrical contact brush 63 is connected to field terminal 81 that extends through the support member 51. This is accomplished by a lead designated by the numeral 82. The other electrical contact brush 64 is connected to the conductive plate 44 by means of a lead 83. This provides a ground connection for brush 64 since the electrical conductive plate 44 is connected to the stator structure 11 of the alternator, more particularly first cup housing 12, by means of metallic spacer 48.

The structure described above for supporting the electrical contact brushes 63 and 64, including support member 51, spring means 72 and brush holders 65 and 66, is more fully disclosed in the copending application S.N. 69,048 mentioned above. The present invention provides a structure for holding the electrical contact brushes 63 and 64 in spaced relationship to the slip rings 27 and 28 during assembly operations. This structure preferably takes the form of a means positioned on the support member 51, for example, a hook or semicylindrical section 91, that is positioned adjacent the brushes 63 and 64 and the brush holders 65 and 66. The stator structure 11, more particularly the first cup housing 12, has an aperture 92 positioned therein that is aligned with the hook or semicylindrical section 91 of the support member 51. Holding means, perferably a cylindrical rod 93, extends through the aperture 92 and is positioned within the hook or semicylindrical section 91 of the support member 51 when the electrical contact brushes 63 and 64 are raised to the position shown in FIGURES 2, 3 and 5. This means holds the brushes in spaced relationship with respect to the slip rings 27 and 28 during assembly operations.

During assembly operations, the structure shown in FIGURE 3 is assembled so that the conductive plates 43 and 44, the support member 51, the brush holders 65 and 66 and the brushes 63 and 64 are mounted within the first cup housing 12. The brush holders 65 and 66 are then rotated into the position shown in FIGURES 2, 3 and 5 and the cylindrical rod or holding means 93 is moved through the aperture 92 and into the hook or semicylindrical section 91 of the support member. In this position the holding means or rod 93 engages the brush holders 65 and 66 and prevents rotation of them toward the slip rings 27 and 28. This positions the brushes 63 and 64 so that they will clear the slip rings 27 and 28 during assembly operations.

The structure shown in FIGURE 3 including first cup housing 12 is then positioned in engagement with the laminated core 14 and the shaft 18 is brought into engagement with the bearing 21 as shown in FIGURE 2. This positions the brushes 63 and 64 in spaced relationship with respect to the slip rings 27 and 28 as shown in this figure and as shown in FIGURE 5. The machine may then be fastened together by the insertion of the machine screws 15 that engage both the first cup housing 12 and the second cup housing 13 to secure these two housings to the laminated core 14. The holding means or cylindrical rod 93 is then removed and the brushes 63 and 64 are urged into engagement with the slip rings 27 and 28 by means of the spring means 72. The brush holders 65 and 66 and the spring means 72 thus provide means for urging the brushes 63 and 64 toward the slip rings 27 and 28, and the hook or semicylindrical section 91 of the support member 51 provides means positioned adjacent the brushes 63 and 64 and aligned with the aperture 92. This last mentioned means and the aperture are adapted to receive the holding means preferably the cylindrical rod 93 that extends through the aperture 92 and engages the means positioned adjacent the brushes 63 and 64 for holding these brushes out of engagement with the slip rings 27 and 28 during assembly operations.

Figure 7:
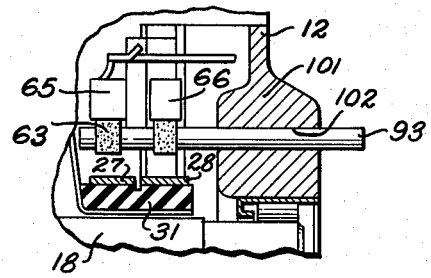
FIGURE 7 is a partial section of another embodiment of the invention taken along the same plane as the view of FIGURE 2.

The embodiment of the invention shown in FIGURE 7 is identical to the structure shown and described with respect to the first six figures of the drawing with the exception that the stator structure 11, preferably the first cup housing 12, has an enlarged boss 101 positioned therein adjacent the brushes 63 and 64. The aperture 102 in this enlarged boss has a very substantial length as can be seen by reference to FIGURE 7. The material surrounding this aperture furnishes a bearing of sufficient length so that the cylindrical section 91 of the support member 51 can be eliminated. A holding means or rod 93 is inserted in the aperture 102 for holding the brushes 63 and 64 in spaced relationship with respect to the slip rings or current conductive means 27 and 28. The aperture 102 and the rod 93 have substantially the same diameter so that the holding means or rod will not cock or move in any direction other than an axial direction. The enlarged boss 101 and the aperture 102 will perform the function that the aperture 92 of short length, as shown in FIGURE 2, and the hook or semicylindrical section 91 of support member 51 performs in the structure shown and described in relation to FIGURES 1 through 6.

It will be obvious to those skilled in the art that the structure of the invention could be employed to position a single electrical contact brush, rather than a pair of them, in spaced relationship to a single slip ring during assembly operations. It is to be understood also that the holding means or cylindrical rod 93 and the hook or semicylindrical section 91 could be positioned so that the rod 93 would engage the brushes 63 and 64 rather than the brush holders 65 and 66.

While the invention has been shown and described particularly in relation to an alternator, it will be readily apparent to those skilled in the art that it can be employed with any dynamoelectric machine in which an electrical contact brush is employed to energize a winding carried by a rotor. This has also been brought out in the introductory portion of the specification.

The present invention thus provides a dynamoelectric machine structure that facilitates assembly of the machine by holding an electrical contact brush in spaced relation to a current conductive means carried by the rotor during assembly operations.

It will be understood that the present invention is not to be limited to the exact construction shown and described, but that various changes and modifications may be made without departing from the spirit and scope of the invention as defined in the appended claims.

I claim:

1. In an alternator, a stator, a rotor mounted within said stator and including a field winding, a pair of slip rings connected to said field windings, a pair of electrical contact brushes adapted to engage said slip rings, a pair of brush holders pivotally supported from said stator, spring means engaging said stator and said brush holders, means supported by said stator and positioned between said brush holders and said slip ring for receiving a rod when said brush holders and said brushes are positioned out of engagement with said slip ring, said stator having an aperture aligned with said last mentioned means for receiving the rod, whereby said brushes may be maintained out of contact with said slip ring when the rod is positioned between said last mentioned means and said brush holders.

2. In an alternator, a stator, a rotor mounted within said stator and including a field winding, a slip ring connected to said field winding, a brush, a brush holder holding said brush, said brush holder being supported from said stator, spring means engaging said brush holder and said stator for urging said brush holder and said brush toward said slip ring, said stator having an aperture positioned therein, said stator including means aligned with said aperture and positioned adjacent said brush holder for receiving a second means that extends through said aperture and holds said brush out of engagement with said slip ring during assembly operations.

3. In an alternator, a stator, a rotor mounted within said stator, said rotor including a field winding and a slip ring connected to said field winding, a brush supported by said stator, first means engaging said brush and said stator for urging said brush toward said slip ring, said stator having an aperture positioned therein, said stator including second means aligned with said aperture and positioned adjacent said brush, said aperture and said last mentioned means being adapted to receive a third means that extends through said aperture and engages said second means for holding said brush out of engagement with said slip ring during assembly operations.

4. In an alternator, a stator, a rotor mounted within said stator, said rotor including a field winding and a pair of slip rings connected to said field winding, a pair of electrical contact brushes adapted to engage said slip rings, a pair of brush holders pivotally mounted from said stator, spring means engaging a portion of said stator and said brush holders for urging said brush holders and said brushes toward said slip rings, said stator having an aperture positioned therein, and means aligned with said aperture and positioned between said slip rings and said brush holders when said brush holders are pivoted into a position where the electrical contact brushes cannot engage said slip ring, said means being adapted to receive a second means extending through said aperture for holding said brushes out of engagement with said slip ring during assembly operations of the alternator.

5. In a dynamoelectric machine, a stator, a rotor mounted within said stator, said rotor including a winding, current conductive means connected to said winding, a brush supported by said stator, means engaging said brush and said stator for urging said brush toward said current conductive means, and removable means extending through said stator and engaging a portion of said stator positioned adjacent said brush for holding said brush in spaced relationship with respect to said current conductive means, said removable means being adapted to be removed to permit said second mentioned means to move said brush into engagement with said current conductive means.

6. In a dynamoelectric machine, a stator, a rotor mounted within said stator, said rotor including a winding, current conductive means connected to said winding, a brush supported by said stator, means engaging said brush and said stator for urging said brush toward said rotor, a rod extending through said stator and operatively engaging said brush and said stator, said rod holding said brush out of contact with said current conductive means, said rod being removable to permit said second mentioned means to move said brush into engagement with said current conductive means.

7. In a dynamoelectric machine, a stator, a rotor mounted within said stator, said rotor including a winding and current conductive means connected to said winding, a brush assembly supported by said stator, means engaging said brush assembly and said stator for urging said brush assembly toward said stator, said stator having an aperture positioned therein, a removable rod means extending through said aperture and operatively engaging said stator and said brush assembly for holding said brush assembly out of engagement with said current conductive means during assembly operations, said second mentioned means moving said brush assembly into engagement with said current conductive means when said removable rod means is removed.

8. In a dynamoelectric machine, a stator, a rotor mounted within said stator, said rotor including a winding and current conductive means connected to said winding, a brush supported by said stator, said stator having an end wall disposed generally perpendicularly with respect to the axis of said rotor, said end wall having an aperture positioned therein spaced radially outwardly from said current conductive means, said aperture extending in a substantially parallel direction with respect to the axis of said rotor, a removable rod means extending through said aperture and operatively engaging said stator and said brush when said brush is raised from said current conductive means for holding said brush in spaced relationship with respect to said current conductive means during assembly operations, said second means urging said brush into contact with said current conductive means when said removable rod means is removed.

9. In a dynamoelectric machine, a stator, a rotor mounted within said stator, said rotor including a winding and a current conductive ring connected to said winding, said stator including a housing having an end wall extending in a direction substantially perpendicular to the axis of the rotor, a brush supported by said stator, means engaging said stator and said brush for urging said brush toward said current conductive ring, said end wall of said housing having a boss positioned adjacent said brush and extending in a direction substantially parallel to the axis of said rotor, said boss having substantial axial length, an aperture positioned in said boss, and means extending through said aperture and operatively engaging said boss and said brush for holding said brush out of engagement with said conductive ring during assembly operations.

10. In a dynamoelectric machine, a stator, a rotor mounted within said stator, said rotor including a winding and a current conductive means connected to said winding, a brush supported by said stator, means engaging said brush and said stator for urging said brush toward said current conductive means, said stator having an end wall disposed in a plane generally perpendicular with respect to the axis of said rotor, said end wall having an aperture positioned therein spaced radially outwardly from said current conductive means, support means on said stator aligned with said aperture, a removable rod means extending through said aperture and operatively engaging said support means and said brush when said brush is raised from said current conductive means for holding said brush in spaced relationship with respect to said current conductive means during assembly operations.

References Cited by the Examiner
UNITED STATES PATENTS
1,519,222   12/1924   Seiss _____ 310—42 X ORIS L. RADER, *Primary Examiner.*

MILTON O. HIRSHFIELD, *Examiner.*